US006576838B2

(12) United States Patent
Matsumura

(10) Patent No.: US 6,576,838 B2
(45) Date of Patent: Jun. 10, 2003

(54) PROTECTIVE COVER AND FUSE BOX

(75) Inventor: Norio Matsumura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/091,354

(22) Filed: Mar. 6, 2002

(65) Prior Publication Data

US 2002/0134572 A1 Sep. 26, 2002

(30) Foreign Application Priority Data

Mar. 7, 2001 (JP) ....................................... 2001-063373
Mar. 26, 2001 (JP) ....................................... 2001-088343

(51) Int. Cl.[7] ................................................ H02G 3/14

(52) U.S. Cl. .......................... 174/66; 174/50; 174/135; 174/138 F; 439/522

(58) Field of Search ............................. 174/66, 67, 50, 174/138 F, 135; 439/522, 621, 763, 521, 202, 904; 429/65; 16/260, 261, 266; 220/241, 242, 3.2, 4.02

(56) References Cited

U.S. PATENT DOCUMENTS

| | | | | | |
|---|---|---|---|---|---|
| 4,698,459 | A | * | 10/1987 | Drake | 174/138 F |
| 5,338,898 | A | * | 8/1994 | Luciano et al. | 174/138 F |
| 5,346,407 | A | * | 9/1994 | Hood | 439/522 |
| 5,413,500 | A | * | 5/1995 | Tanaka | 439/521 |
| 5,439,759 | A | * | 8/1995 | Lippert et al. | 429/65 |
| 5,576,516 | A | * | 11/1996 | Kameyama et al. | 174/138 F |
| 5,643,693 | A | * | 7/1997 | Hill et al. | 429/121 |
| 5,645,448 | A | * | 7/1997 | Hill | 439/522 |
| 5,804,770 | A | * | 9/1998 | Tanaka | 174/138 F |
| 5,815,886 | A | * | 10/1998 | Nishio et al. | 16/360 |
| 5,820,413 | A | * | 10/1998 | Yamada et al. | 439/621 |
| 5,871,364 | A | * | 2/1999 | Shinchi et al. | 439/144 |
| 5,910,029 | A | * | 6/1999 | Siedlik et al. | 439/522 |
| 5,977,485 | A | * | 11/1999 | Yoshimura et al. | 174/138 F |
| 6,376,771 | B1 | * | 4/2002 | Kosuge | 174/66 |
| 6,398,595 | B2 | * | 6/2002 | Wakata et al. | 439/766 |
| 6,413,124 | B2 | * | 7/2002 | Murakami et al. | 439/773 |

FOREIGN PATENT DOCUMENTS

| | | | | |
|---|---|---|---|---|
| JP | 10-220424 A | | 8/1998 | |
| JP | 10-338085 A | | 12/1998 | |
| JP | 11041751 | * | 2/1999 | 174/66 |

* cited by examiner

*Primary Examiner*—Hung V. Ngo
*Assistant Examiner*—Angel R. Estrada
(74) *Attorney, Agent, or Firm*—Sughrue Mion, PLLC

(57) ABSTRACT

A side wall 58 of a fuse unit 52 is provided with a guide groove 59 positioned close to a rotating portion 31 and a concave portion 60 positioned apart from the rotating portion 31. The guide groove is constituted by a wide portion 59*a* having an inclined guide face 59*c* and a narrow portion 59*b* extended in a closing direction successively to the wide portion. A groove wall surface linking the wide portion and the narrow portion is set to be a position regulating face 59*d* for a guide rib 25. Internal surfaces of side walls 22*b* and 22*c* of a second cover 21 constituting a protective cover 10 are provided with the guide rib to enter the guide groove and a locking convex portion 26 to be engaged with the concave portion, and an internal surface of an upper wall 22*a* of the second cover is provided with a position regulating rib 27 to abut on the upper part of the fuse unit. The locking convex portion and the position regulating rib are provided in the same plane which is orthogonal to both side walls of the second cover.

14 Claims, 12 Drawing Sheets

PROTECTIVE COVER AND FUSE BOX

BACKGROUND OF INVENTION

1. Field of the Invention

The present invention relates to a protective cover and a fuse box which are applied to a fuse unit directly attached to a battery post of a battery to be mounted on a vehicle and serve to protect a fuse.

2. Related Art

A battery to be mounted on a vehicle has a pair of battery posts formed of a lead alloy. In order to supply a power from the battery to various electrical equipment, a chain type fuse element (fuse-element) having a plurality of terminal connecting portions is attached to some battery posts. The fuse element is provided in a resin body to constitute a fuse unit. There is also provided a fuse unit having a plurality of terminal connecting portions that is attached to some battery posts. The fuse unit is constituted by a fuse element formed integrally with a fuse and a resin body for accommodating the fuse element.

Since the terminal connecting portion and the fuse in the fuse element are exposed to the outside, they are apt to be corroded and are generally covered with a protective cover. The protective cover is formed to be a separate piece in consideration of the necessity for exchanging a terminal or viewing a fuse at time of vehicle assembly or maintenance. Such a protective cover is removably attached to the resin body of the fuse unit by various engaging means. The protective cover and the fuse unit constitute a fuse box.

Further, the terminal connecting portion and the fuse are exposed from the resin body and corrosion is apt to be caused by the invasion of water drops. In general, therefore, the upper part of the fuse unit is covered with a battery cover in order to carry out insulation, waterproofing and dust-proofing in such a portion.

FIG. 9 shows an example of a conventional fuse box disclosed in JP-A-10-338085. A fuse box 101 thus shown can efficiently carry out a work for exchanging a fusible link 102.

The fuse box 101 comprises a box body 110 for accommodating the fusible link 102 and a cover member 120 for covering the box body 110. The box body 110 is provided with a housing portion 111 for the fusible link 102 in which an upper part 111*a* and both lower sides 111*b* and 111*c* are opened. In the conventional example, the fusible link 102 and the box body 110 constitute a fuse unit.

The fusible link 102 is inserted from the upper part 111*a* into the housing portion 111, a head portion 102*a* is exposed from the upper part 111*a*, and furthermore, tab terminals 102*b* and 102*c* are exposed from both lower sides 111*b* and 111*c*. Moreover, a terminal 130 for power supply is connected through an attachment bolt to the tab terminal 102*b* of the fusible link 102 accommodated in the housing portion 111, and a terminal 140 having an electric wire is connected to the tab terminal 102*c* through an attachment bolt. Furthermore, a terminal 103 for battery connection is connected to the terminal 130 for power supply through a nut, and the terminal 103 for battery connection is connected to a battery post of a battery.

The cover member 120 comprises an upper cover portion 121 for covering the upper part 111*a* of the box body 110, a lower cover portion 122 provided vertically under the upper cover portion 121 and serving to cover both lower sides 111*b* and 111*c* of the housing portion 111, and a battery post cover portion 123 for covering the battery post of the battery. The battery post cover portion 123 is provided successively to the upper cover portion 121. Such a cover member 120 is provided in the box body 110 to be rotatable at 90 degrees through a hinge 124 including a rotating shaft 124*a* and a bearing 124*b*.

However, while the box body 110 and the cover member 120 are removably coupled to each other through the hinge 124 and the cover member 120 can be supported rotatably, the bearing 124*b* for supporting the rotating shaft 124*a* is curved to have a small thickness. In some cases in which an operation for opening and closing the cover member 120 is repeated for a long period of time, therefore, the bearing 124*b* is plastically deformed. In some cases in which the bearing 124*b* is plastically deformed, it cannot hold the rotating shaft 124*a*. There is a possibility that the cover member 120 might be removed from the box body 110 so as not to fulfill the original function of the protective cover.

Moreover, when the cover member 120 is to be closed, a stopper 122*a* protruded from the lower cover portion 122 abuts on the box body 110 to regulate rotation. In some cases in which the cover member 120 is to be opened, the cover member 120 is excessively opened to plastically deform the bearing 124*b* so that the cover member 120 is separated from the box body 110 as described above because there is no stopper for regulating the rotation.

Also in the case in which the box body and the cover member are coupled integrally through a hinge, the same problem arises. Usually, the hinge is formed to have a small thickness in order to enhance the operability of an opening and closing cover and might be broken due to a fatigue when an opening and closing operation is repeated. In some cases, thus, the cover member is removed so as not to fulfill the function of the protective cover.

The battery cover is formed integrally with the resin body or is formed separately in consideration of the necessity for exchanging a terminal or viewing a fuse at time of vehicle assembly or maintenance. The separate battery cover is removably attached to the resin body by engaging means.

FIGS. 17 and 18 show an example of a conventional battery cover constituted separately. As shown in FIG. 17, a battery cover 400 is integrally constituted by a first cover 401 for covering the upper part of a fuse unit (not shown) a second cover 411 for covering a battery post, and a hinge portion 408 for coupling the first cover 401 to the second cover 411. The battery cover 400 is formed of a synthetic resin such as heat-resistant vinyl chloride.

The first cover 401 takes the shape of a box cover having a housing space for the fuse unit in an internal space. One of the sides of the first cover 401 is provided with an opening 404 such that a terminal having an electric wire can be inserted therein. A hinge portion 408 for openably rotating and holding the second cover 411 is integrally formed on the other side of the first cover 401 along the edge portion of an upper wall 402.

The first cover 401 is removably attached to a resin body (not shown) formed by insert molding a fuse element with the use of engaging means. A lock portion 405 provided on a side wall 403 of the first cover 401 is engaged with a concave portion formed on the side wall of the resin body.

The second cover 411 is an openable protective cover which is integrally formed successively to the hinge portion 408 and serves to cover the battery post connecting portion side of the fuse unit and the battery post, and is constituted by an almost crank-shaped upper wall 412 seen on a plane and a side wall 413 linked to the periphery of the upper wall 412 at an almost right angle. The upper wall 412 is crank-shaped because it is formed corresponding to the shape of the fuse unit.

The hinge portion 408 is a junction member for coupling the first cover 401 to the second cover 411 and is formed successively to the upper wall 402 of the first cover 401 and the upper wall 412 of the second cover 111. The hinge portion 408 is plate-shaped and functions as a center of rotation for the second cover 411.

FIG. 18 shows an opening and closing track 420 of the second cover 411. The second cover 411 is opened and closed by describing a circular hole curve with the hinge portion 408 to be the center of rotation. Moreover, FIG. 18 also illustrates that the second cover411 opposed to a bulged wall 416 of a battery 415 interferes with the upper part of the bulged wall 416 so that the opening and closing operation cannot be carried out smoothly. In consideration of such a situation, a space 421 is provided between the bulged wall 416 and the second cover 411 and a relief portion (nick-shaped opening) 417 is formed in the part of the interference of the second cover 411.

However, when the battery cover 400 according to the prior art is applied to the battery 415 having the bulged wall 416 on the periphery, there is a problem in that the second cover 411 interferes with the bulged wall 416 when opening and closing the second cover 411 because the opening and closing track 420 of the second cover 411 is protruded toward the bulged wall 416 side around the battery post. The reason is that the battery cover 400 is to be formed in a high position in order to protect a stud bolt protruded from the upper surface of the fuse unit, and at the same time, the hinge portion 408 is also provided in a high position. In the prior art, accordingly, a space 421 is formed between the second cover 411 and the bulged wall 416 and the relief portion 417 is provided on the side wall 413 of the second cover 111 in order to avoid the interference.

However, when the relief portion 417 is provided, there is a possibility that conductive foreign substances or water drops might enter to reduce insulating, waterproof and dustproof effects by half in the case of application to a battery having no bulged wall 416 on the periphery.

Furthermore, the hinge portion 408 coupling the first cover 401 to the second cover 411 is on almost a level with the upper wall 402 of the first cover 401 and the upper wall 412 of the second cover 411, and there is no stopper for regulating the opening angle of the second cover 411. Therefore, there is a possibility that the second cover 411 might be opened excessively to plastically deform the hinge portion 408 (fatigue), resulting in a breakage of the second cover 411.

SUMMARY OF THE INVENTION

In consideration of the respects described above, the invention has an object to provide a protective cover and a fuse box which can cause a removed single cover piece to function as a protective cover for covering a fuse unit and can carry out a closing operation and fix the cover easily and reliably even if the hinge of the rotating cover is broken or disconnected due to a fatigue.

Another object provides a battery cover in which even if a bulged wall is provided around a battery post, the interference of a second cover and the bulged wall formed around the battery post can be avoided, and the sealing property of the battery cover against a fuse unit can be enhanced to block the invasion or waterdrops, resulting in an insulating property, a waterproof property and a dustproof property.

Moreover, the invention has another object to provide a battery cover capable of preventing the plastic deformation of a hinge portion and prolonging a lifetime without damaging the opening and closing operational property of the second cover.

In order to achieve the object, a first aspect of the invention is directed to a protective cover which is constituted by a first cover for covering a fuse unit connected to a battery post and a second cover linked to the first cover through a rotating portion, the second cover being openable by setting the rotating portion to be a center of rotation, wherein an internal surface of a side wall of the second cover is provided with a guide rib corresponding to a guide groove of a side wall of the fuse unit and a locking convex portion corresponding to a concave portion of the side wall of the fuse unit.

Moreover, a second aspect of the invention is directed to the protective cover according to the first aspect of the invention, wherein a position regulating rib to abut on an upper part of the fuse unit is protruded from an internal surface of an upper wall of the second cover.

Furthermore, a third aspect of the invention is directed to a fuse box which is constituted by a fuse element having a plurality of fuses formed therein, a fuse unit including a resin body having the fuse element provided therein, and a protective cover comprising a first cover for covering the fuse unit and a second cover linked to the first cover through a rotating portion, the second cover being openable by setting the rotating portion to be a center of rotation, wherein a side wall of the fuse unit is provided with a guide groove positioned close to the rotating portion and a concave portion positioned apart from the rotating portion, and an internal surface of a side wall of the second cover is provided with a guide rib for entering the guide groove and a locking convex portion to be engaged with the concave portion.

Moreover, a fourth aspect of the invention is directed to the fuse box according to the third aspect of the invention, wherein a position regulating rib to abut on an upper part of the fuse unit is protruded from an internal surface of an upper wall of the second cover.

Furthermore, a fifth aspect of the invention is directed to the fuse box according to the third or fourth aspect of the invention, wherein the guide groove is constituted by a wide portion having an inclined guide face and a narrow portion extended in a closing direction successively to the wide portion.

Moreover, a sixth aspect of the invention is directed to the fuse box according to any of the third to fifth aspects of the invention, wherein the locking convex portion and the position regulating rib are provided in the same plane which is orthogonal to both side walls of the second cover.

Furthermore, a seventh aspect of the invention is directed to the fuse box according to any of the third to sixth aspects of invention, wherein a groove wall surface linking the wide portion to the narrow portion is a position regulating face for the guide rib.

In order to attain the objects, an eighth aspect of the invention is directed to a battery cover which is constituted by a first cover for covering an upper part of a fuse unit to be connected to a battery post and a second cover linked to the first cover through a hinge portion, and the second cover can be opened by setting the hinge portion to be a center of rotation, wherein a connecting portion is provided successively to the hinge portion, and the hinge portion and the connecting portion are provided in lower positions than an upper wall of the first cover and an upper wall of the second cover.

Moreover, an ninth aspect of the invention is directed to the battery cover according to the eighth aspect of the invention, wherein the connecting portion is connected integrally with the second cover.

Furthermore, a tenth aspect of the invention is directed to the battery cover according to the eighth or ninth aspect of the invention, wherein the hinge portion is formed in a lower position than an upper surface of a bulged portion provided around the battery post.

Moreover, an eleventh aspect of the invention is directed to the battery cover according to any of the eighth to ninth aspects of the invention, wherein a first inclined wall is provided between the hinge portion and the first cover, a second inclined wall is provided between the connecting portion and the second cover, and both of the inclined walls abut so that an opening angle of the second cover is regulated.

Furthermore, a twelfth aspect of the invention is aspect of the invention, wherein the first inclined wall and the connecting portion form an obtuse angle.

Moreover, a thirteenth aspect of the invention is directed to the battery thirteenth cover according to any of the first to fifth aspects of the invention, wherein the hinge portion is formed to have a smaller thickness than that of the connecting portion.

Furthermore, a fourteenth aspect of the invention is directed to the battery cover according to any of the ninth to thirteenth aspects of the invention, wherein it is also effective that the hinge portion is provided between two parallel stud bolts of the fuse unit.

Functions and effects based on the structure will be described below.

In the first aspect of the invention, when the second cover is to be closed, the guide rib enters the guide groove of the fuse unit and the guide rib abuts on the groove wall of the guide groove to stop the rotation of the second cover. Subsequently, the locking convex portion is engaged with the concave portion of the fuse unit so that the second cover is fixed to the fuse unit.

In the case in which the second cover is removed from the rotating portion and thereby becomes a single piece and the cover is to be closed, the guide rib enters the guide groove of the fuse unit from above and is guided by the guide groove, and at the same time, abuts on the groove wall and is thereby positioned in a longitudinal direction. Then, the locking convex portion is engaged with the concave portion of the fuse unit so that the second cover is fixed. If the guide rib is not provided, the cover is loosened in the longitudinal direction and the locking convex portion is brought into a blind state and is thereby attached with difficulty.

In the second aspect of the invention, the position regulating rib is protruded from the internal surface of the upper wall of the second cover. Therefore, the tip face of the position regulating rib abuts on the upper part of the fuse unit (the upper surface of the fuse element) to carry out positioning in a vertical direction (a direction of a height). Then, the locking convex portion is engaged with the concave portion on the other side so that the second cover is fixed to hold the fuse unit.

In the third aspect of the invention, the guide groove corresponding to the guide rib of the second cover is provided on the side wall of the fuse unit. Therefore, the cover is rotated without the interference of the guide rib with the side wall to block the operation for closing the cover, and the guide rib abuts on the groove wall of the guide groove so that the rotation of the cover is stopped. Since the side wall of the fuse unit is provided with the concave portion with which the locking convex portion of the cover is to be engaged, the second cover is reliably fixed without removal.

In the case in which the second cover is removed from the rotating portion and thereby becomes a single piece, the guide rib enters the guide groove and is guided by the groove wall. The second cover is positioned in the longitudinal direction and is prevented from being loosened. Consequently, the locking convex portion of the second cover is engaged with the concave portion on the other side so that the second cover is fixed.

In the fourth aspect of the invention, the position regulating rib is protruded from the internal surface of the upper wall of the second cover. Therefore, positioning in the vertical direction (the direction of a height) is carried out by the position regulating rib. In that case, the locking convex portion is engaged with the concave portion on the other side so that the second cover is fixed to hold the fuse unit.

In the fifth aspect of the invention, the wide portion of the guide groove has the inclined guide face, and furthermore, has an entry space for the guide rib. Therefore, the guide rib slides over the guide face to enter the narrow portion of the guide groove, and the second cover is then positioned in the longitudinal direction.

In the sixth aspect of the invention, when the second cover is fixed to the fuse unit, the locking convex portion and the position regulating rib have such a positional relationship that couple is not generated. Therefore, it is possible to prevent the second cover from being deformed or rotated by a moment of the couple.

In the seventh aspect of the invention, the guide rib of the second cover abuts on the position regulating face to be the groove wall surface close to the hinge portion of the guide groove so that the cover is accurately positioned in the longitudinal direction, and the locking convex portion is not brought into the blind state but is engaged with the concave portion of the fuse unit.

In the eighth aspect of the invention, since the hinge portion and the connecting portion are provided in lower positions than the upper wall of the first cover and the upper wall of the second cover, the second cover is not protruded toward the bulged wall side provided around the battery post so that the interference of the bulged wall with the second cover can be avoided. More specifically, the center of rotation of the second cover forming the opening and closing track is placed in a lower position than the upper wall of the cover. Therefore, the opening and closing track of the second cover is moved in such a direction as to go away from the bulged wall so that the protrusion of the opening and closing track with the opening and closing operation of the second cover can be reduced.

In the ninth aspect of the invention, since the connecting portion is formed successively to the second cover, the hinge portion is provided behind the connecting portion so that the radius of curvature of the opening and closing track of the second cover can be increased.

In the tenth aspect of the invention, the center of rotation of the second cover is placed in a lower position than the upper surface of the bulged portion provided around the battery post. Therefore, the tipmost position of the opening and closing track of the cover with respect to the bulged wall is not protruded toward the bulged wall side so that the interference of the second cover with the bulged wall can be avoided.

In the eleventh aspect of the invention, the first cover abuts on both inclined walls of the second cover so that the opening angle of the second cover can be regulated to prevent the plastic deformation of the hinge portion due to excessive opening.

In the twelfth aspect of the invention, since the connecting portion intersects the first inclined wall at an obtuse angle, the opening and closing operation of the second cover can be prevented from being blocked.

In the thirteenth aspect of the invention, the hinge portion is formed to have a smaller thickness than that of the connecting portion. Therefore, the flexibility of the hinge portion can be enhanced, and the second cover can be smoothly opened upward and closed downward. Accordingly, a workability can be enhanced at time of vehicle assembly or maintenance.

In the fourteenth aspect of the invention, the hinge portion is provided between the two stud bolts protruded from the upper surface of the fuse unit. Therefore, the hinge portion can be formed in a low position even if the height of the battery cover is great.

DETAILED DESCRIPTION OF PREFERRED EMBODIMENTS

A specific example or an embodiment according to the invention will be described below in detail with reference to the drawings.

Figure 4:
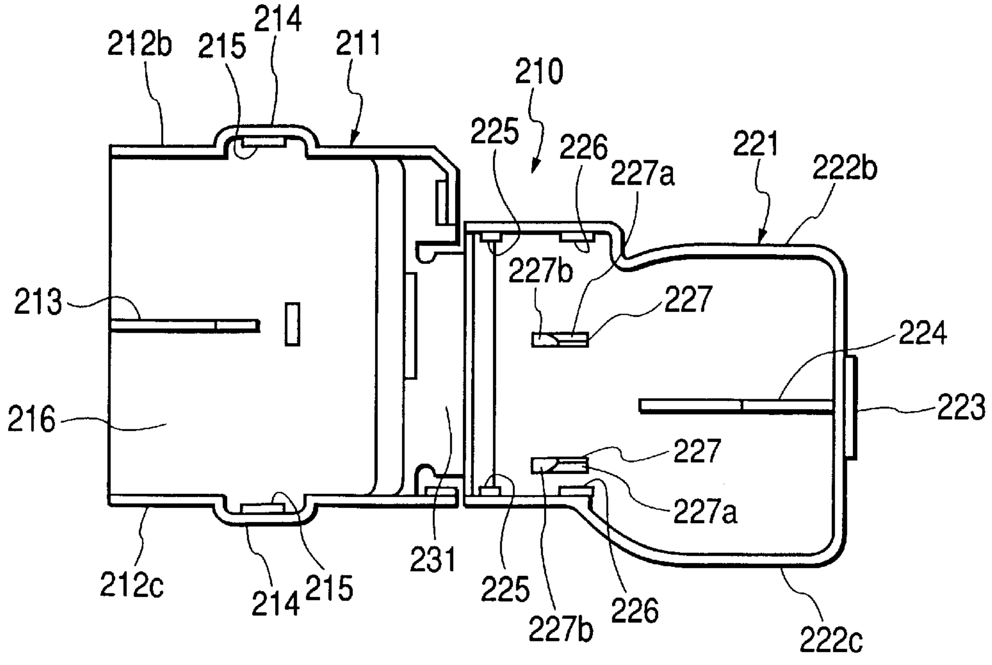
FIG. 4 is a bottom view showing the protective cover illustrated in FIG. 1.
Figure 5:
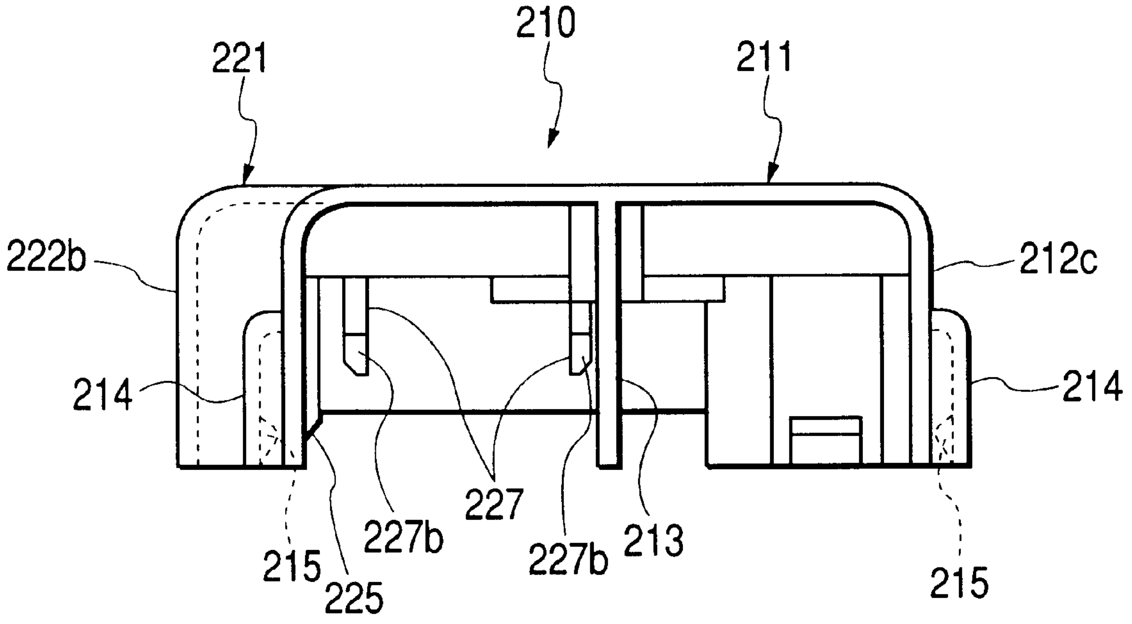
FIG. 5 is a side view showing the protective cover illustrated in FIG. 1.
Figure 6:
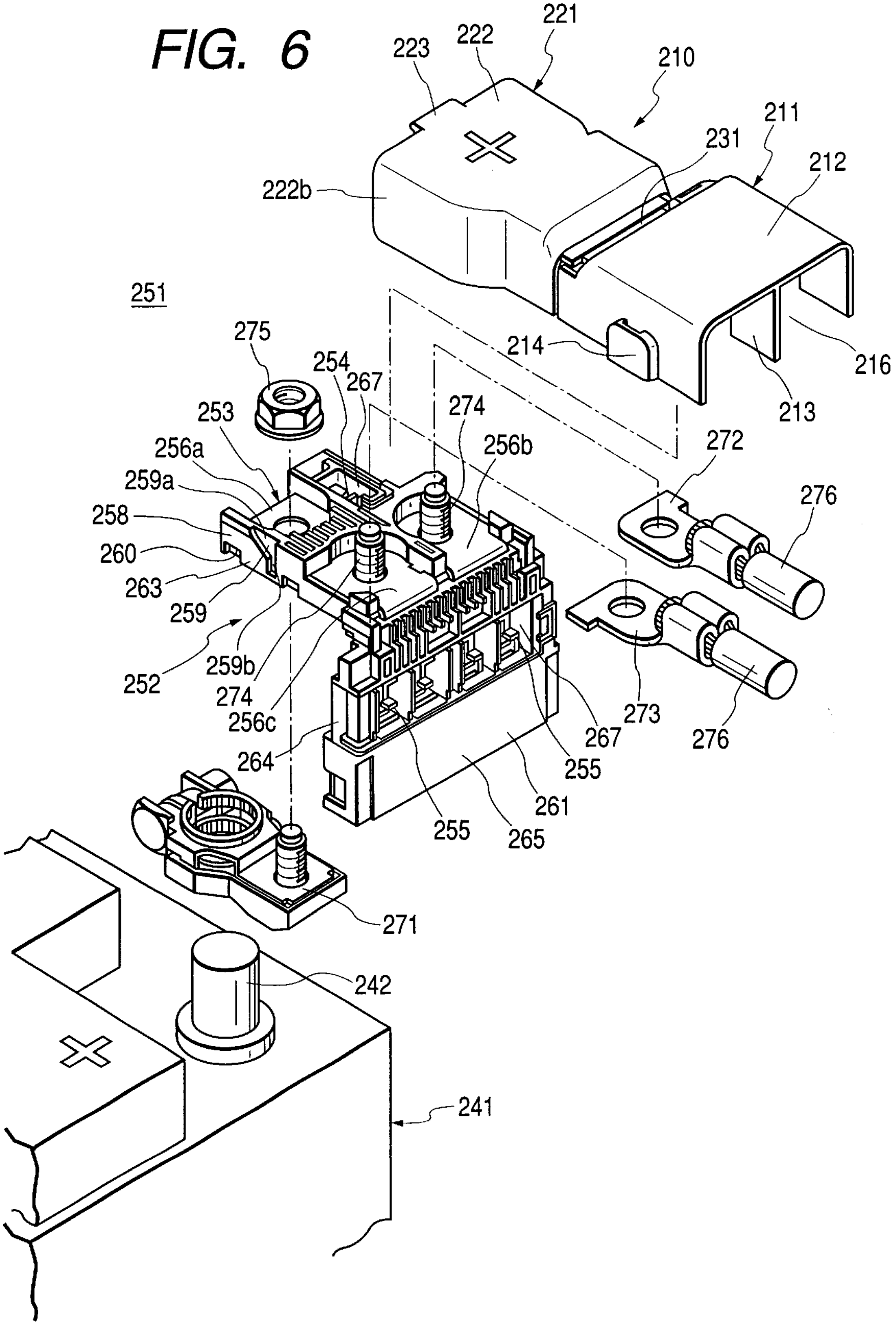
FIG. 6 is an exploded perspective view showing an embodiment of a fuse box according to the invention.
Figure 7:
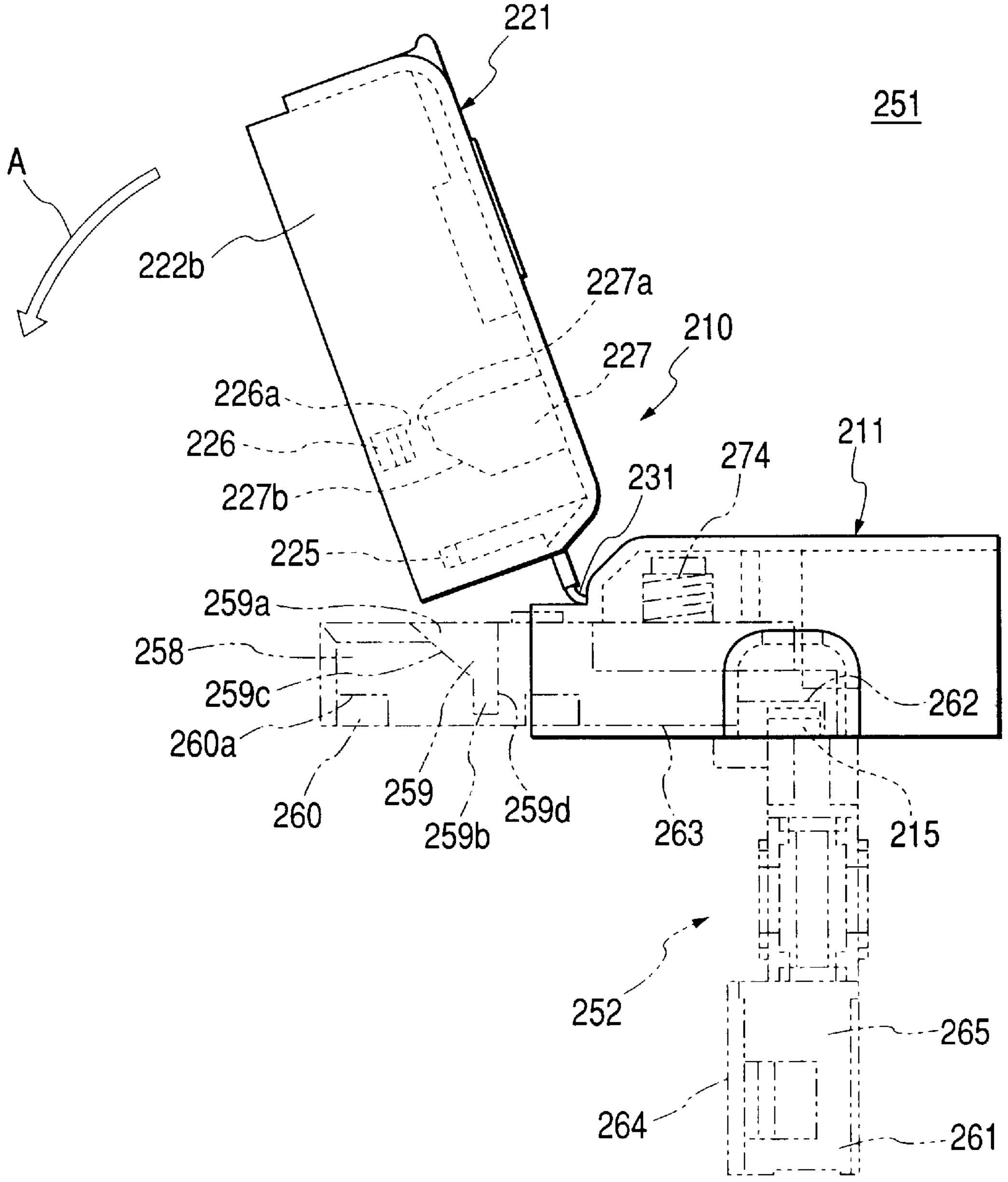
FIG. 7 is a view showing a state in which an opening and closing cover connected to a fuse unit through a hinge portion is to be closed.
Figure 8:
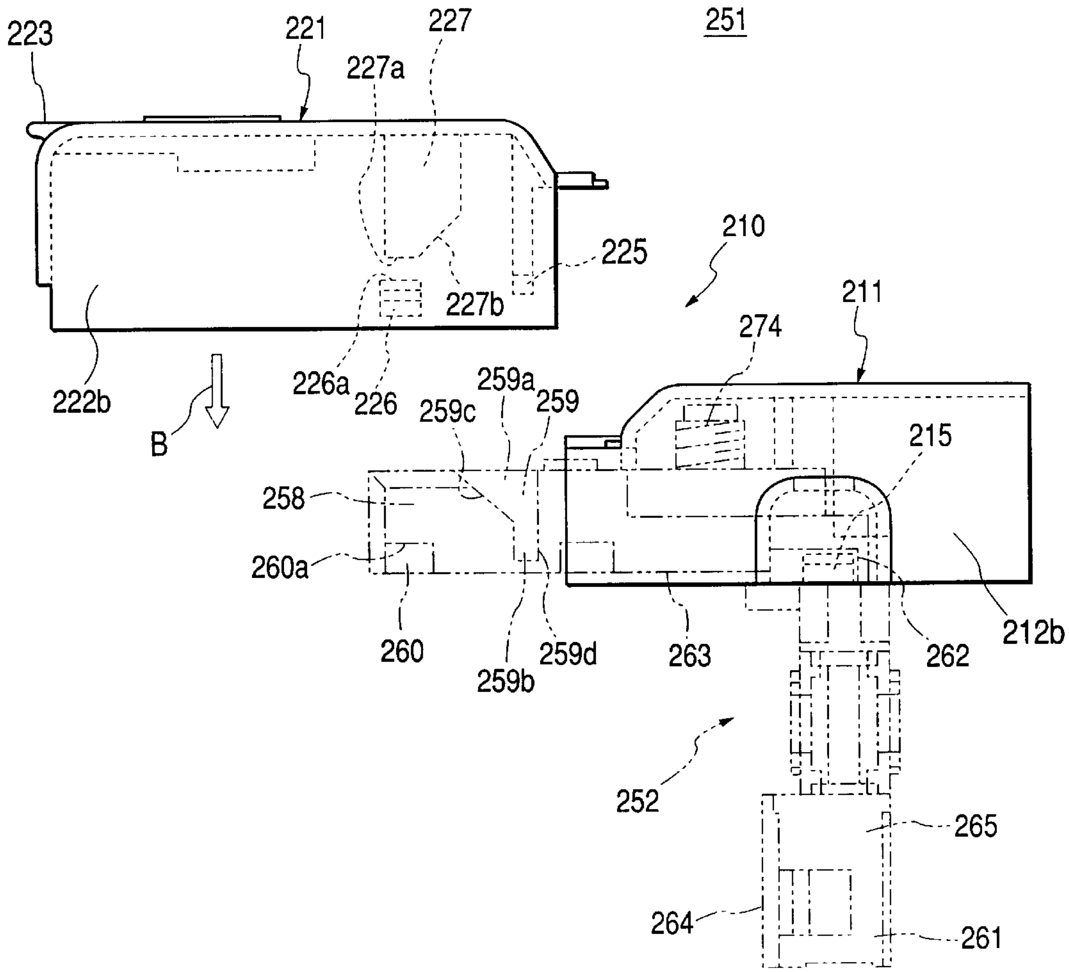
FIG. 8 is a view showing a state in which the opening and closing cover from which the hinge portion is disconnected with respect to the fuse unit is to be closed by utilizing a guide groove.
Figure 9:
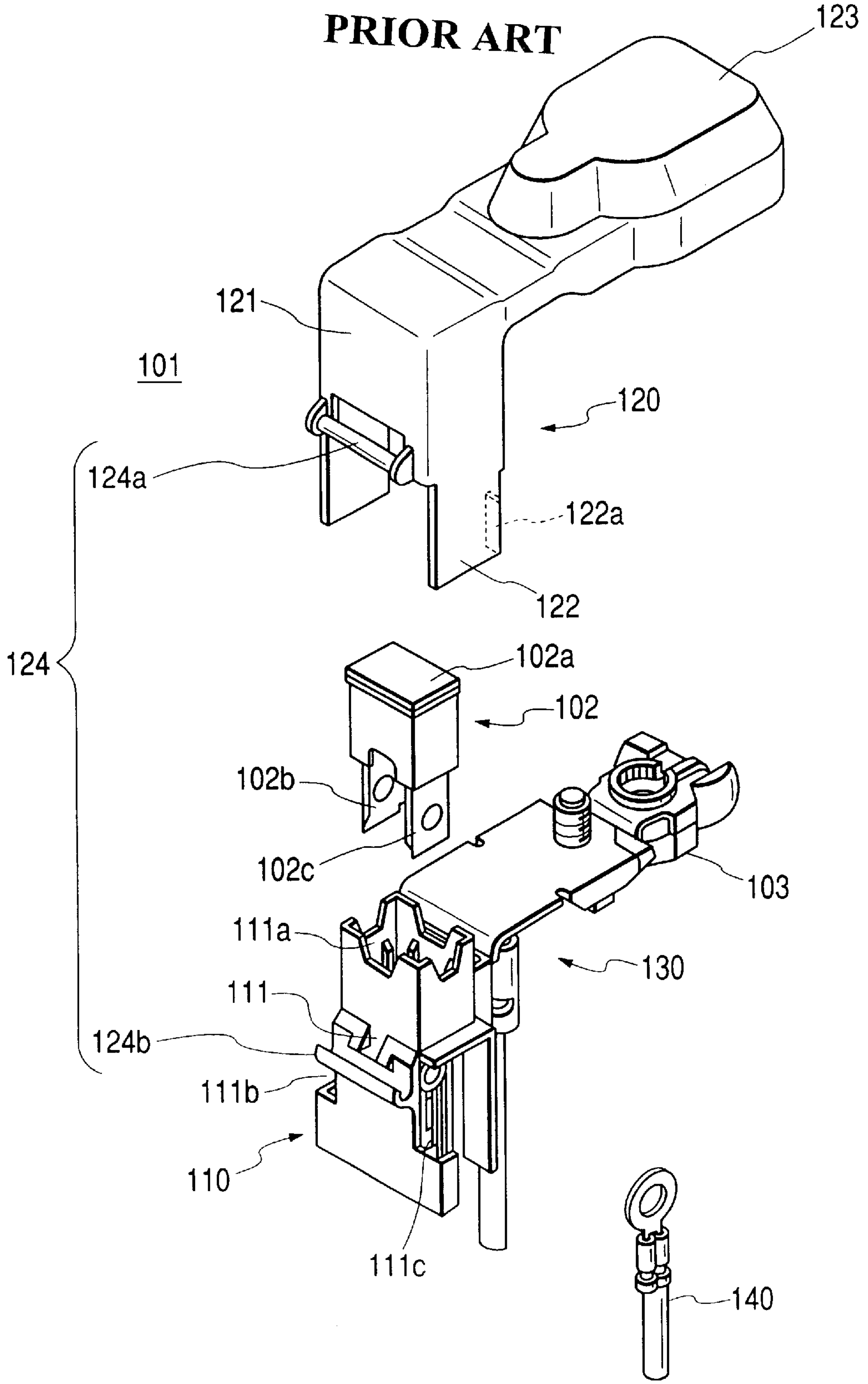
FIG. 9 PRIOR ART
FIG. 9 is a perspective view showing an example of a conventional fuse box.
Figure 10:
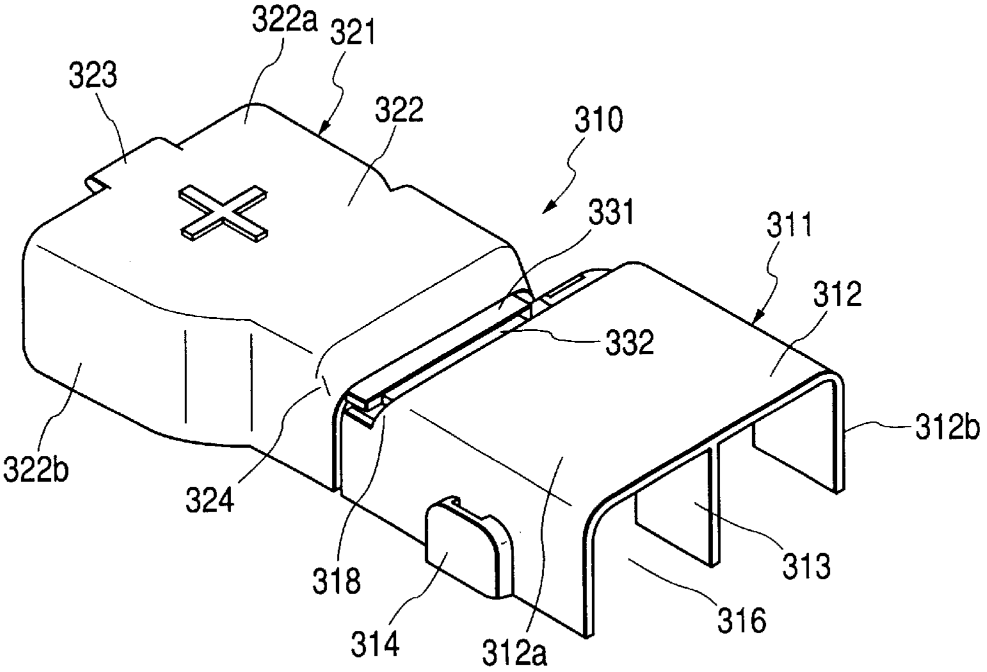
FIG. 10 is a perspective view showing an embodiment of a battery cover according to the invention.

FIGS. 1 to 5 show an embodiment of a protective cover according to the invention, and FIGS. 6 to 8 show an embodiment of a fuse box constituted by the protective cover and a fuse unit.

Figure 1:
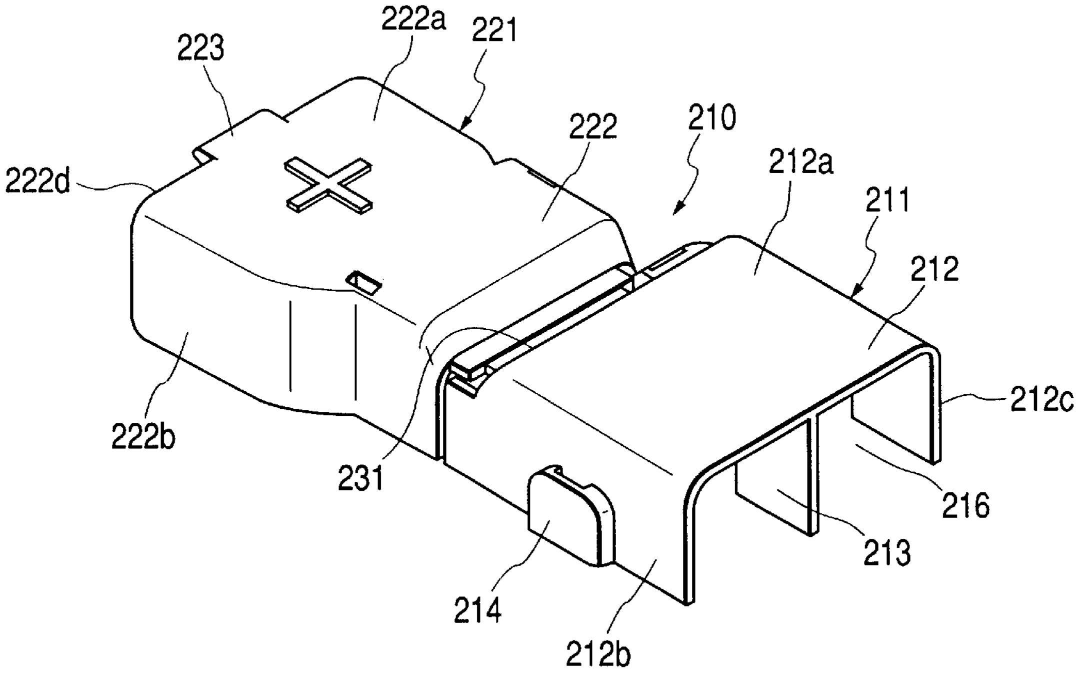
FIG. 1 is a perspective view showing an embodiment of a protective cover according to the invention.

As shown in FIG. 1, a protective cover 210 is constituted by a fixing cover (a first cover) 211 for covering the upper part of a fuse unit 252 (FIG. 6) to be connected to a battery post 242, and an opening and closing cover (a second cover) 221 to be connected to the fixing cover 211 through a hinge portion (a rotating portion) 231. The opening and closing cover 221 is rotatable by setting the hinge portion 231 to be a center of rotation. The fuse unit 252 will be described below and is constituted by a fuse element 253 provided with a plurality of fuses 254 and 255 and a resin body 261 (see FIG. 6) having the fuse element 253 provided therein.

The protective cover 210 is formed of a synthetic resin such as heat-resistant vinyl chloride or other plastics, and takes the shape of a box in which a lower surface is opened such that the fuse unit 252 can be covered from above.

The fixing cover 211 is constituted by a covering portion 212 having both side walls **212*b* and 212*c* bent at almost 90 degrees, a partitioning portion 213 formed downward in the middle part of the covering portion 212, and lock portions 214 and 214 provided on both side walls 212*b* and 212*c* of the covering portion 212. A rear wall is opened such that a terminal having an electric wire can be inserted therethrough. A front wall opposed to the rear wall is provided successively to the opening and closing cover 221 through the hinge portion 231. For convenience of the description, in the concept of front and rear, the battery post 242** side is set to the front side and the connecting side of the terminal having an electric wire is set to the rear side. The concept of right and left implies a transverse direction which is orthogonal to a longitudinal direction.

An internal space 216 of the fixing cover 211 is divided into two parts by the partitioning portion 213. The internal space 216 is constituted by the division in order to insulate terminal connecting portions **256*b* and 256*c* (see FIG. 6) formed in two left and right portions of the fuse unit 252**.

The lock portions 214 and 214 serve to removably fix the fixing cover 211 to the fuse unit 252. A convex portion (see FIG. 4) 215 is formed on the inside of the lock portions 214 and 214, and the convex portion 215 is engaged with a concave portion 262 (see FIG. 7) provided on a side wall 258 of the fuse unit 252 so that the fixing cover 211 is fixed to the fuse unit 252.

Next, the opening and closing cover 221 includes an almost crank-shaped upper wall **222*a*, both side walls 222*b* and 222*c* bent on the periphery of the upper wall 222*a* at an almost right angle, and a front wall 222*d*. The upper wall 222*a* takes the shape of a crank because it is formed corresponding to the shape of the fuse unit 252. Both side walls 222*b* and 222*c* are on a level with both side walls 212*b* and 212*c* of the fixing cover 211**.

The upper wall **222*a* is provided with a partitioning portion 224 (see FIG. 3) and a flange portion 223. The partitioning portion 224 is protruded downward in an almost middle position in a transverse direction. An empty chamber portion 267 having the fuse 254 and a terminal connecting portion 256*a* are insulated by the partitioning portion 224**.

The flange portion 223 is formed ahead of the upper wall **222*a* such that an operation for opening the opening and closing cover 221 can easily be carried out. The opening operation is carried out by first unlocking both side walls 222*b* and 222*c* of the opening and closing cover 221 to be opened outward and catching and lifting the flange portion 223** with a finger.

Figure 2:
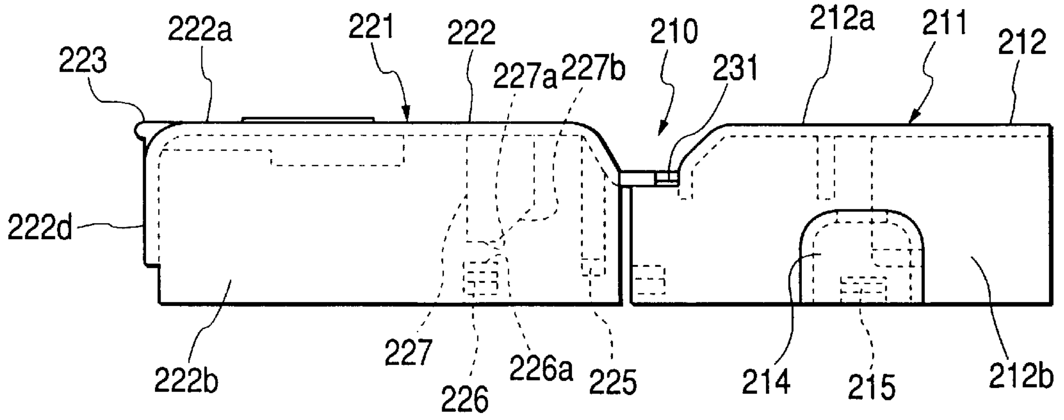
FIG. 2 is a front view showing the protective cover illustrated in FIG. 1.
Figure 3:
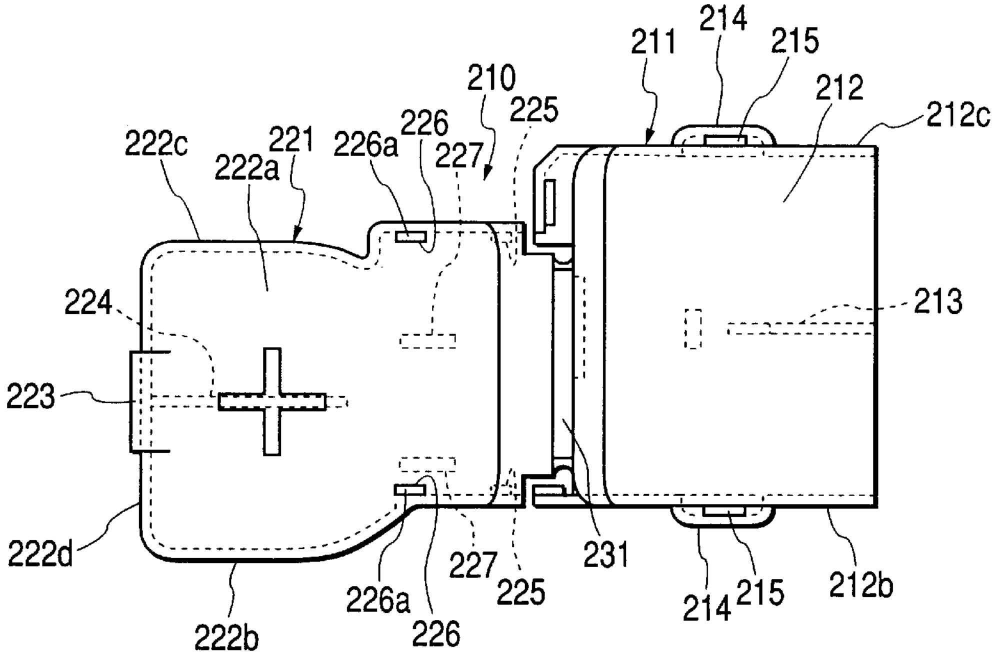
FIG. 3 is a is a plan view showing the protective cover illustrated in FIG. 1.

As shown in FIGS. 2 and 3, the internal surfaces of both side walls 222*b* and 222*c* of the opening and closing cover 221 are provided with a guide rib 225 corresponding to a guide groove 259 of the fuse unit 252, and a locking convex portion 226 corresponding to a concave portion 260 of the fuse unit 252, and a position regulating rib 227 to abut on the upper part of the fuse unit 252 is protruded from the internal surface of the upper wall 222*a* of the opening and closing cover 221.

The guide rib 225 is a rib-shaped protrusion which is extended in a vertical direction, and is positioned close to the hinge portion 231 provided behind both side walls 222*b* and 222*c*. The guide rib 225 is positioned close to the hinge portion 231 in order to reduce a radius of curvature of a circular arc locus described by the guide rib 225 with the operation for closing the second cover 221, to form the guide groove 259 of the side wall 258 of the fuse unit 252 as much as possible and to provide the locking concave portion 260 in a residual space.

Moreover, the guide rib 225 is extended downward from the position regulating rib 227 which will be described below, and the tip portion of the guide rib 225 is positioned on almost a level with the locking convex portion 226 (FIG. 2). By such positioning, the opening and closing cover 221 can be accurately positioned in a longitudinal direction so that a locking reliability can be enhanced.

As shown in FIG. 7, the guide groove 259 on the other side corresponding to the guide rib 225 is constituted by a wide portion 259*a* having an inclined guide face 259*c* on the side wall 258 of the fuse unit 252 and a narrow portion 259*b* extended in the closing direction of the opening and closing cover 221 successively to the wide portion 259*a*.

Since the groove wall surface on one side (front side) of the wide portion 259*a* is the guide face 259*c*, the guide rib 225 of the opening and closing cover 221 is guided while sliding over the guide face 259*c*. Moreover, a space for causing the guide rib 225 to enter is maintained in the wide portion 259*a*, thereby avoiding such a situation that the guide rib 225 describing the circular arc locus interferes with the side wall 258 during the operation for closing the opening and closing cover 221.

The narrow portion 259*b* is provided successively to the wide portion 259*a* and is extended in the closing direction of the opening and closing cover 221. In the closing state of the opening and closing cover 221, a gap is formed between the narrow portion 259*b* and the tip portion of the guide rib 225. The gap is formed in order to position the opening and closing cover in a direction or a height by the position regulating rib 227 which will be described below.

The groove of the narrow portion 259*b* is set such that the guide rib 225 can be restrained without a looseness. If the looseness is generated, the locking convex portion 226 of the opening and closing cover 221 cannot be engaged with the concave portion of the fuse unit 252 at one touch.

The groove wall surfaces on one side (close to the hinge portion) of the wide portion 259*a* and the narrow portion 259*b* are connected straight in the direction of a height and constitute a position regulating face 259*d*. The position regulating face 259*d* is a face on which the guide rib 225 abuts. Consequently, the opening and closing cover is positioned so that the opening and closing cover 221 can be locked reliably.

Such a structure that the guide groove 259 is provided is particularly effective when the thin hinge portion 231 is disconnected so that the opening and closing cover 221 becomes a separate member. If the guide groove 259 is not provided, the longitudinal positioning is not carried out so that the locking convex portion 226 of the opening and closing cover 221 is brought into a blind state and cannot be engaged with the concave portion 260 of the fuse unit 252 on the other side. Accordingly, when the guide rib 225 is guided to the guide groove 259, the opening and closing cover 221 is positioned longitudinally and is thus fixed to the fuse unit 252 reliably without generating a looseness.

As shown in FIG. 2, the locking convex portion 226 is protruded from the lower side of the internal surfaces of the side walls 222*b* and 222*c* of the opening and closing cover 221. While the guide rib 225 is positioned close to the hinge portion 231, the locking convex portion 226 is positioned apart from the hinge portion 231. The locking convex portion 226 is positioned ahead of the guide rib 225 in order not to obstruct the operation for opening and closing the opening and closing cover 221 and to carry out locking after positioning.

Moreover, the locking convex portion 226 is positioned under the position regulating rib 227. Consequently, the positioning in the direction of a height is carried out by the position regulating rib 227, and at the same time, a convex portion engagement face 226*a* of the locking convex portion 226 abuts on a concave portion receiving face 260*a* (see FIG. 7) of the concave portion 260 of the fuse unit 252 so that the opening and closing cover 221 is reliably fixed to hold the fuse unit 252.

As shown in FIGS. 3 to 5, the position regulating rib 227 is positioned in parallel in a transverse direction and is protruded downward from the internal surface of the upper wall 222*a*. The position regulating rib 227 serves to abut on the terminal connecting portion 256*a* (see FIG. 6) of a battery terminal 271 exposed from the empty chamber portion 267 of the resin body 261, thereby carrying out positioning in the direction of a height. A stud bolt 274 for terminal connection is straight exposed from the terminal connecting portion 256*b* of an alternator terminal 272 and the terminal connecting portion 256*c* of a starter motor terminal 273. Therefore, the protrusion of the position regulating rib 227 has such a length that the upper wall 222*a* of the opening and closing cover 221 does not interfere with the stud bolt 274 (see FIG. 6).

As shown in FIGS. 7 and 8, the locking convex portion 226 and the position regulating rib 227 are positioned in the same plane which is orthogonal to both side walls 222*b* and 222*c* of the second cover 221. The locking convex portion 226 and the position regulating rib 227 have such a positional relationship that couple is not generated, in other words, the locking convex portion 226 and the position regulating rib 227 are positioned such that lines of action of forces in opposite directions to each other which are applied to both of them are formed in the same plane. Therefore, a moment of couple is not generated and the opening and closing cover 221 is fixed reliably so that a locking reliability can be enhanced.

The hinge portion 231 (FIGS. 3 and 7) is provided between the fixing cover 11 and the opening and closing cover 221 to integrally connect both covers 211 and 221. Moreover, the hinge portion 231 is formed in a lower position than the upper walls 212*a* and 222*a* of the fixing cover 211 and the opening and closing cover 221. The reason is that a radius of curvature of the opening and closing locus of the opening and closing cover 221 is to be increased and a forward protrusion of the opening and closing locus is to be reduced by lowering the hinge portion 231 to be a center of rotation of the opening and closing cover 221. Such a structure is suitable for the European battery in which the upper part of the battery 241 is not a flat surface but has a bulged portion, and has an advantage that the interference of the opening and closing cover 221 with the bulged wall can be prevented.

The hinge portion 231 is formed more thinly than the upper walls 212*a* and 222*a* of both covers 211 and 221 to have a flexibility. Accordingly, the opening and closing cover 221 can be opened and closed smoothly. The hinge portion 231 is curled almost annularly so that a stress can be distributed wholly, thereby effectively preventing a fatigue or a breakage with the passage of time.

Next, the ruse unit constituting the ruse box will be described with reference to FIGS. 6 to 8. The fuse unit 252 serves to connect the battery 241 to an electric wire 276 for power supply, and is constituted by a plate-shaped fuse element 253 formed of conductive metal and including the fuses 254 and 255 and an insulating resin body 261 formed by insert molding the fuse element 253. While the fuse unit 252 thus shown is bent at almost 90 degrees from a middle portion, it is molded in an extension state in a one-dimensional direction during molding. Such molding is carried out because a rapping step can easily be performed.

FIG. 6 shows the finishing state of the fuse unit 252 formed by integrally molding the resin body 261 to be an insulating synthetic resin material on the surface and back of the fuse element 253, and shows a state in which the fuse unit 252 is bent and is assembled into the battery 241 for a vehicle.

First of all, the fuse element 253 is punched out of one conductive metal plate, has a flexible portion integrally in a middle portion and can be freely bent at the flexible portion in a direction of a plate thickness. If the flexible portion has a thickness equal to that of the fuse element 253, it can be flexed sufficiently. The flexible portion of the fuse element 253 is provided in a portion in which a resin material of a resin mold (not shown) is not injected, and is thereby exposed to the outside of the resin body 261.

Four tab terminals which are not shown are arranged in parallel on the end of a conductive metal plate provided vertically by setting the flexible portion to be the boundary. Each tab terminal is provided successively to the fuse 255 exposed from the resin body 261. The tab terminal is protruded and positioned into the connector fitting chamber of a connector housing 265 integrated with the resin body 261. The tab terminal and the connector housing 265 constitute a female-type connector.

The terminal connecting portion 256*a* for the battery terminal 271, the terminal connecting portion 256*c* for the starter motor terminal 273 and the terminal connecting portion 256*b* for the alternator terminal 272 are formed in a conductive metal plate provided horizontally. The fuse 254 is provided between the terminal connecting portion 256*a* for the battery terminal 271 and the terminal connecting portion 256*b* for the alternator terminal 272.

Next, the resin body 261 is formed by a division into front and rear sides with the middle portion to be the boundary. The fuses 254 and 255 are provided on both end sides of the fuse element 253 and are positioned in an empty chamber portion 267 of the resin body 261, and include a metal chip formed of an alloy of tin or lead. The resin body 261 is also formed to be bendable at almost 90 degrees in the middle portion. The resin body 261 is partitioned into a dividing portion 263 positioned in a horizontal direction by setting the middle portion to be the boundary and a dividing portion 264 positioned in a vertical direction.

The dividing portion 263 in the horizontal direction is fastened and connected to the battery terminal 271 with a nut 275 in a vertical direction and is fastened and connected to the battery post 242 by utilizing the annular portion of the battery terminal 271. The dividing portion 264 in the vertical direction is vertically provided along the side wall surface of the battery 241 in a bending state at almost 90 degrees.

In a method of manufacturing the fuse unit 252, the fuse element 253 is first punched out of a conductive metal plate (not shown) and the fuse element 253 is set to a resin mold (not shown), and a molten resin material is injected into the resin mold, thereby integrally molding the resin body 261 on the surface and back of the fuse element 253. In this case, the resin body 261 provided around the terminal connecting portions 256*a*, 256*b* and 256*c* and the fuses 254 and 255 is set to be an empty chamber to expose the conductor surface of the fuse element 253.

FIG. 7 shows a state in which the opening and closing cover 221 connected to the fuse unit 252 through the hinge portion 231 is to be closed. The opening and closing cover 221 is rotated in a closing direction by describing a predetermined opening and closing locus A with the hinge portion 231 to be a center of rotation. The guide rib 225 enters the guide groove 259 of the fuse unit 252 and abuts on the groove wall of the guide groove 259 to stop the rotation of the opening and closing cover 221. The guide groove 259 functions as a stopper for rotation regulation. The locking convex portion 226 is engaged with the concave portion 60 of the fuse unit 252 so that the opening and closing cover 221 is fixed to the fuse unit 252.

FIG. 8 shows a state in which the opening and closing cover 221 from which the hinge portion 231 is disconnected with respect to the fuse unit 252 is to be closed by utilizing the guide groove 259. When the opening and closing cover 221 is to be closed, the opening and closing cover 221 is caused to enter the fuse unit 252 from above. The guide rib 225 enters the guide groove 259 of the fuse unit 252 and is restrained by the guide groove 259, and the opening and closing cover 221 is positioned in a longitudinal direction. The locking convex portion 226 is engaged with the concave portion 260 of the fuse unit 252 so that the opening and closing cover 221 is fixed.

Second Embodiment

FIGS. 10 to 14 and 16 show a second embodiment of a battery cover according to the invention. A battery cover 310 is provided separately from a fuse unit 361 (see FIG. 16). When the battery cover 310 is once attached, it is possible to easily maintain a battery terminal and to view a fuse 363 by simply opening and closing a second cover 321 which will be described below.

The battery cover 310 is formed of a synthetic resin such heat-resistant vinyl chloride or other plastics, and takes the shape of a box in which a lower surface is opened such that the fuse unit 361 can be covered from above and a rear wall is opened such that an alternator terminal 382 and a starter motor 383 (see FIG. 16) can be inserted therethrough.

As shown in FIGS. 10 to 13, the battery cover 310 is integrally constituted by a first cover 311 for covering the upper part of the fuse unit 361 and a second cover 321 connected to the first cover 11 through a hinge portion 332. A connecting portion 331 to the hinge portion 332 is formed integrally with the second cover 321.

The first cover 311 is constituted by a covering portion 312 having both side walls 312*b* and 312*b* bent at almost 90 degrees, a partitioning portion 313 formed in the middle part of the covering portion 312, and lock portions 314 and 314 provided on both side walls 312*b* and 312*b* of the covering portion 312. The rear wall is opened such that the terminals 382 and 383 having an electric wire can be inserted therethrough. A front wall opposed to the rear wall is provided successively to the second cover 321 through the hinge portion 332 and the connecting portion 331. For convenience of the description, in the concept of front and rear, the battery post 342 side is set to the front side and the connecting side of the terminals 382 and 383 having an electric wire is set to the rear side. The concept of right and left implies the side orthogonal to a longitudinal direction.

An internal space 16 of the first cover 311 is divided into two parts by the partitioning portion 313. Since terminal connecting portions 365*b* and 365*c* of the fuse unit 361 are formed in two right and left portions, the internal space 316 is divided (see FIG. 16). The right and left terminals 382 and 383 having an electric wire are insulated by the partitioning portion 313.

The lock portion 314 serves to removably fix the first cover 311 to the fuse unit 361. A convex portion 315 (see FIG. 11) is formed on the inside of the lock portion 314, and the convex portion 315 is engaged with a concave portion provided on the side wall of the fuse unit 361 so that the first cover is fixed.

Figure 11:
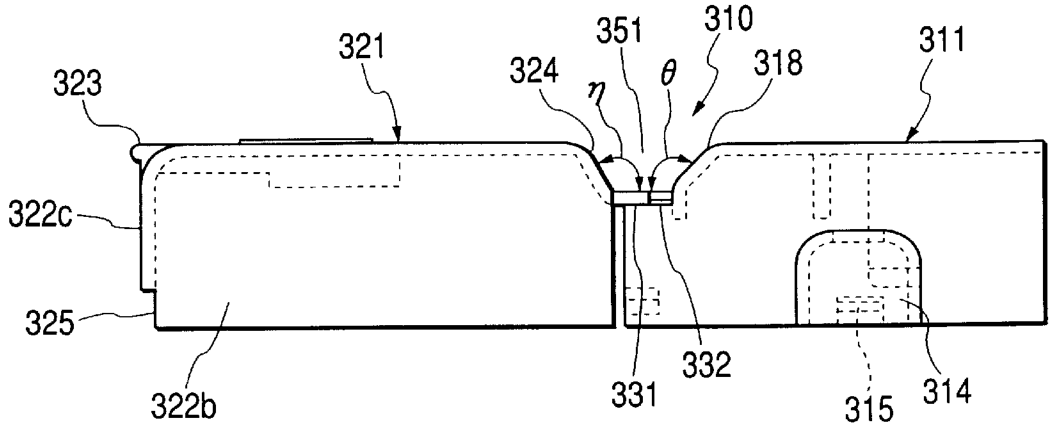
FIG. 11 is a front view showing the battery cover illustrated in FIG. 10.
Figure 12:
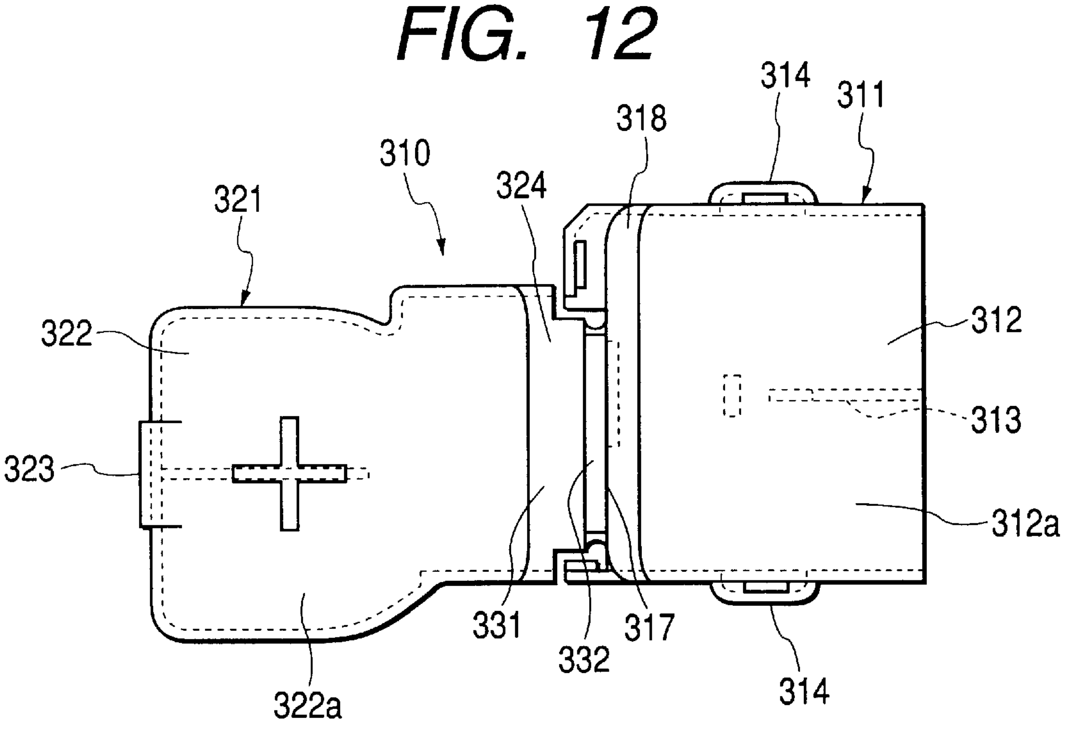
FIG. 12 is a plan view showing the battery cover illustrated in FIG. 10.
Figure 13:
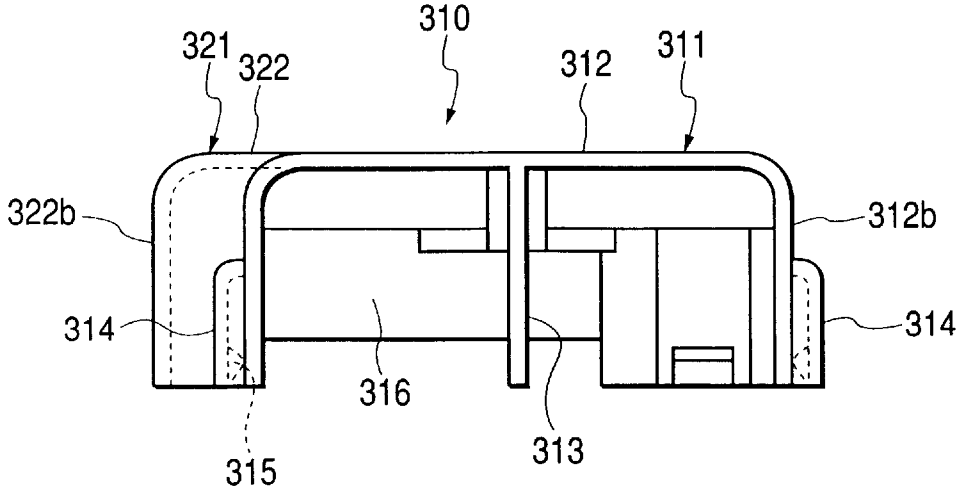
FIG. 13 is a side view showing the battery cover illustrated in FIG. 10.

Next, the second cover 321 includes an almost crank-shaped upper wall 322*a*, both side walls 322*b* and 322*b* bent on the periphery of the upper wall 322*a* at an almost right angle, and a front wall 322*c* (FIG. 11). A flange portion 323 is formed on the front side of the upper wall 322*a* and the operation for opening the second cover 321 can easily be carried out by holding and lifting the flange portion 323 upward.

The upper wall 322*a* of the second cover 321 takes the shape of a crank because it is formed corresponding to the shape of the fuse unit 361. The side walls 322*b* and 322*b* are on a level with the side walls 312*b* and 312*b* of the first cover 311. The second cover 321 can be opened by setting, to be a center of rotation, the hinge portion 332 formed in the edge part of the connecting portion 31. Therefore, the second cover 321 can be opened at one touch to connect the terminals 381, 382 and 383 and to view the fuse 363.

The second cover3 21 is a protective cover for covering the upper parts on the front side of a battery post 342 and the fuse unit 361 and blocking the invasion of water drops to insulate the fuse unit. The second cover 321 is different from the first cover 311 in that it can be opened and closed by setting the hinge portion 332 to be the center of rotation. At time of vehicle assembly or maintenance, it is necessary to connect the terminals 381, 382 and 383 and to view the fuse 363. In such a case, if the battery cover 310 is attached/removed at each time, a work becomes complicated to deteriorate a workability. A fuse 364 provided on the side where the fuse unit 361 is bent downward is not covered with the battery cover 310. Therefore, viewing can always be carried out, which has no problem.

The connecting portion 331 is a plate-shaped member connecting the second cover 321 to the hinge portion 332 and is accommodated in an opening step portion 317 (FIG. 12) of an upper wall 312*a* of the first cover 311. As shown in FIG. 11, a groove-shaped bent space 351 is formed by the connecting portion 331 and a first inclined wall 318 and a second inclined wall 324 which are positioned on both sides of the connecting portion 331. The bent space 351 is an operation space in which the second cover 321 can be opened and closed.

Figure 17:
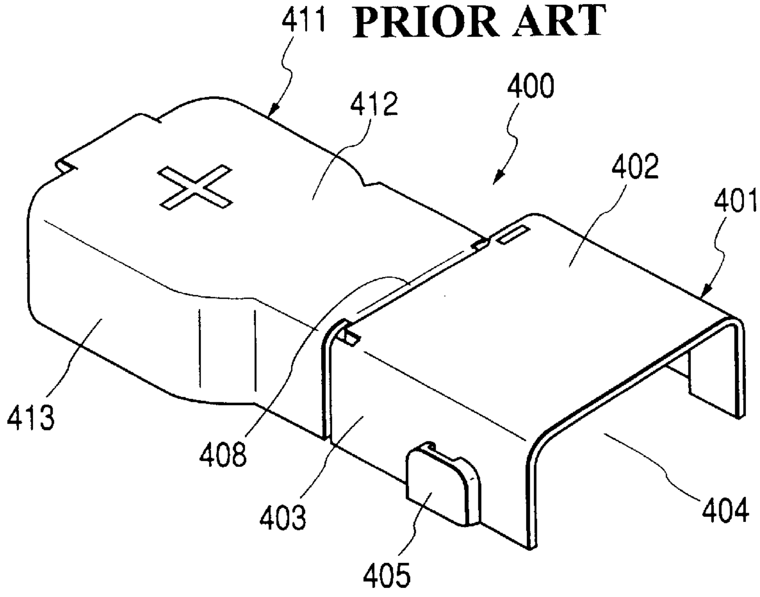
FIG. 17 PRIOR ART
FIG. 17 is a perspective view showing an example of a conventional battery cover.
Figure 18:
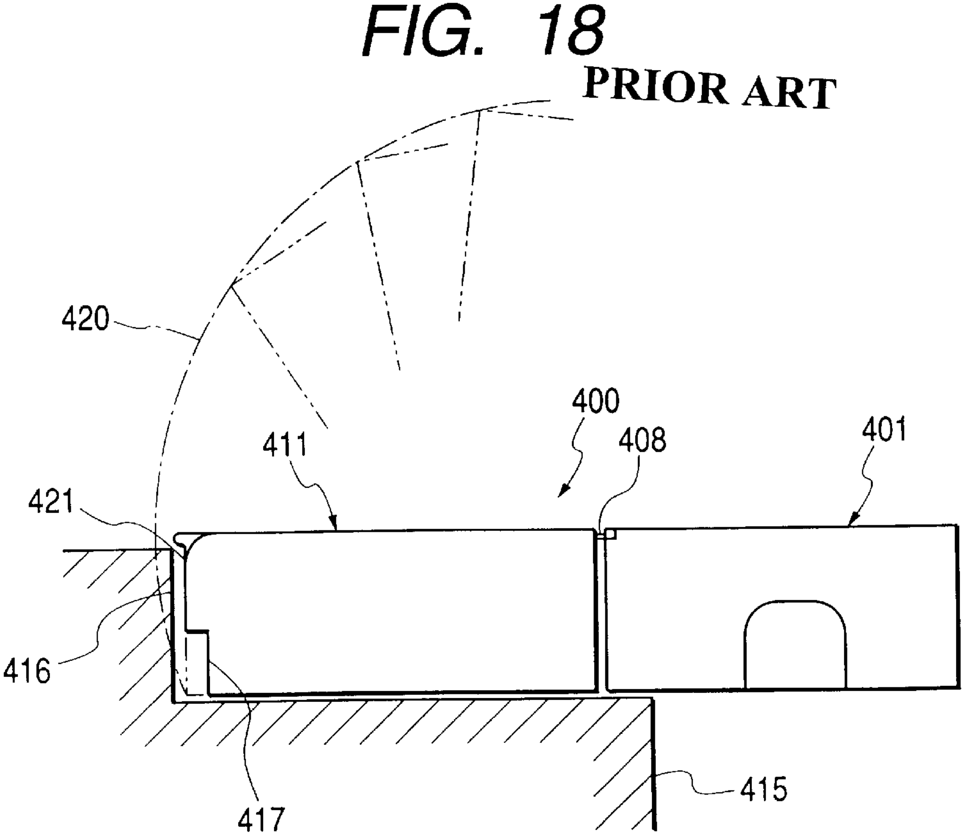
FIG. 18 PRIOR ART
FIG. 18 is a view showing the opening and closing track of the battery cover illustrated in FIG. 17.

The connecting portion 331 and the hinge portion 332 are formed in lower positions than the upper walls 312*a* and 322*a* of the first cover 311 and the second cover 322. Conventionally (see FIGS. 17 and 18), a stud bolt 387 exposed from the upper surface of the fuse unit 61 obstructs so that the hinge portion 408 cannot be formed in a low position. In the invention, the connecting portion 331 and the hinge portion 332 are positioned between the stud bolts 387 of the fuse unit 361 and can be thereby formed in low positions.

The first inclined wall 318 is provided between the hinge portion 332 and the first cover 311 and the second inclined wall 324 is provided between the connecting portion 331 and the second cover 321, and both of the inclined walls 318 and 324 are opposed to each other at a predetermined opening angle. The first inclined wall 318 functions as a stopper for the second cover. In other words, both of the inclined walls 318 and 324 abut so that the second cover 321 is not opened any more.

The second inclined wall 324 and the connecting portion 331 cross each other at an obtuse angle $\eta$ and are formed integrally with each other to take the shape of a dogleg or an inverted dogleg. The first inclined wall 318 and the connecting portion 331 also form an obtuse angle $\theta$. By the obtuse angles $\eta$ and $\theta$, an opening angle $\delta$ (see FIG. 14) of the second cover 321 is regulated.

The hinge portion 332 is formed more thinly than the connecting portion 331 to have a flexibility. Accordingly, the second cover 321 can be opened and closed smoothly. The hinge portion 332 is curled almost annularly so that a stress can be distributed wholly, thereby effectively preventing a fatigue or a breakage with the passage of time.

As described above, the hinge portion 332 is formed in a lower position than the upper walls 312*a* and 322*a* of the covers 311 and 321. Therefore, the opening and closing track 350 of the second cover 321 is not protruded toward the bulged wall 343 side (see FIG. 14) around the battery post 342 and the interference of the second cover 321 with the bulged wall 343 is prevented. Furthermore, the hinge portion 332 is formed in a lower position than the upper surface of a bulged portion 346. Consequently, the opening and closing track 350 of the second cover 321 is moved in such a direction as to go away from the bulged wall 343, thereby effectively preventing the interference of the second cover 321 with the bulged wall 343.

Figure 14:
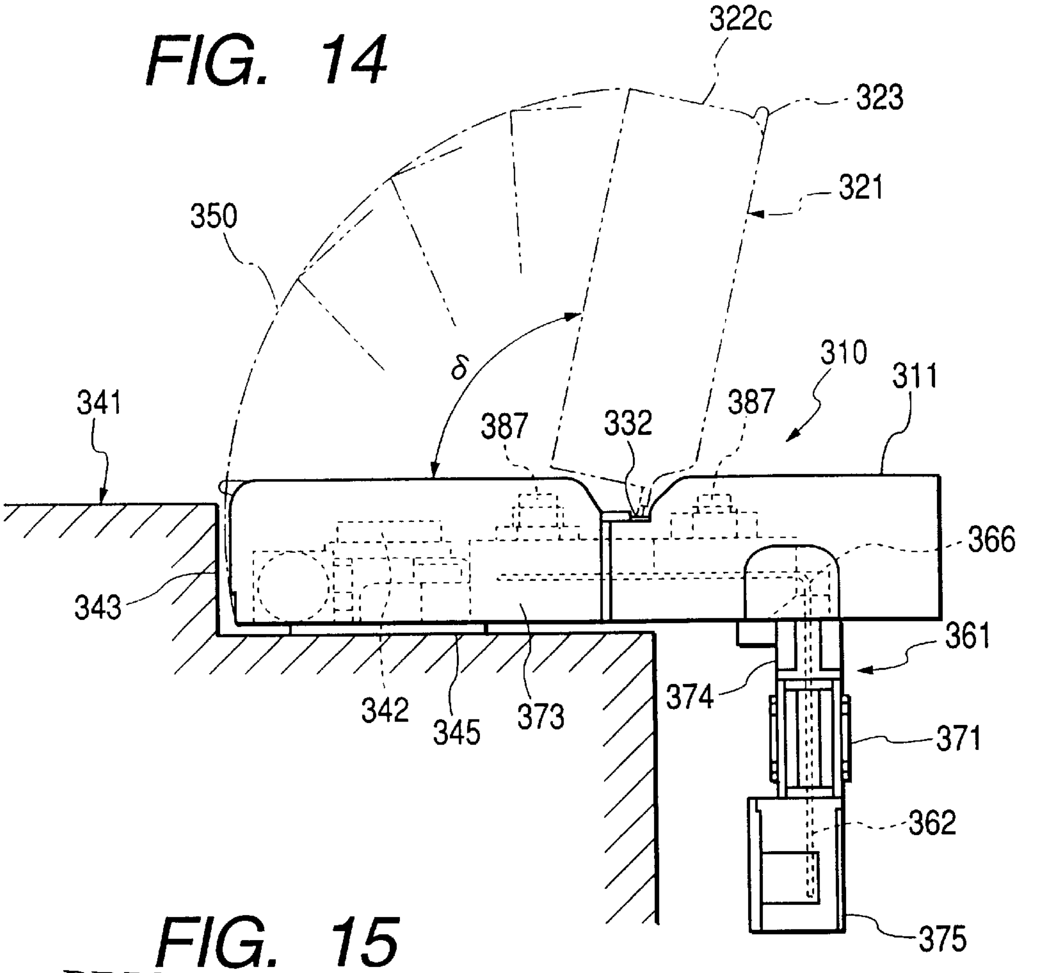
FIG. 14 is a view showing the opening and closing track of the battery cover illustrated in FIG. 10.

FIG. 14 shows the opening and closing track 350 of the second cover 321. The second cover 321 is opened and closed by describing a circular hole curve with the hinge portion 332 set to be the center of rotation. Moreover, FIG. 14 also shows that the opening and closing operation can be carried out smoothly without protruding the second cover 321 toward the bulged wall 343 of the battery 341. As compared with the conventional art, therefore, the relief portion 325 of the front wall 322*c* of the second cover 321 can be formed to be smaller, the sealing property of the second cover 321 can be enhanced, and the invasion of the waterdrops can be blocked so that the insulating, waterproof and dustproof effects of the fuse unit can be enhanced.

Figure 15:
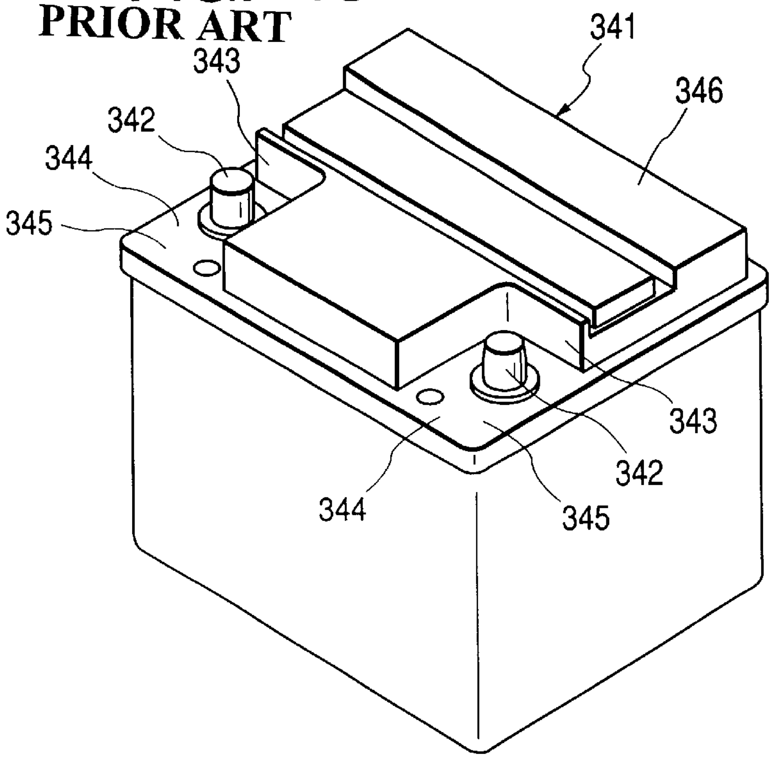
FIG. 15 PRIOR ART
FIG. 15 is a view showing the shape of the appearance of an example of the European battery.

FIG. 15 shows an example of the battery 341 to be mounted on a foreign vehicle. The battery 341 is different from a battery to be mounted on a home-manufactured vehicle in that the upper surface of the battery 341 is not flat but has the bulged portion 346 as shown. A rectangular attachment space 344 is provided in the corner portion of the upper surface and a pair of battery posts 342 having positive and negative poles are provided in the attachment space 344.

The attachment space 344 is partitioned by the L-shaped or inverted L-shaped bulged wall 343. The fuse unit 361 and the battery cover 310 are attached along a flat surface 345 of the attachment space 344.

Figure 16:
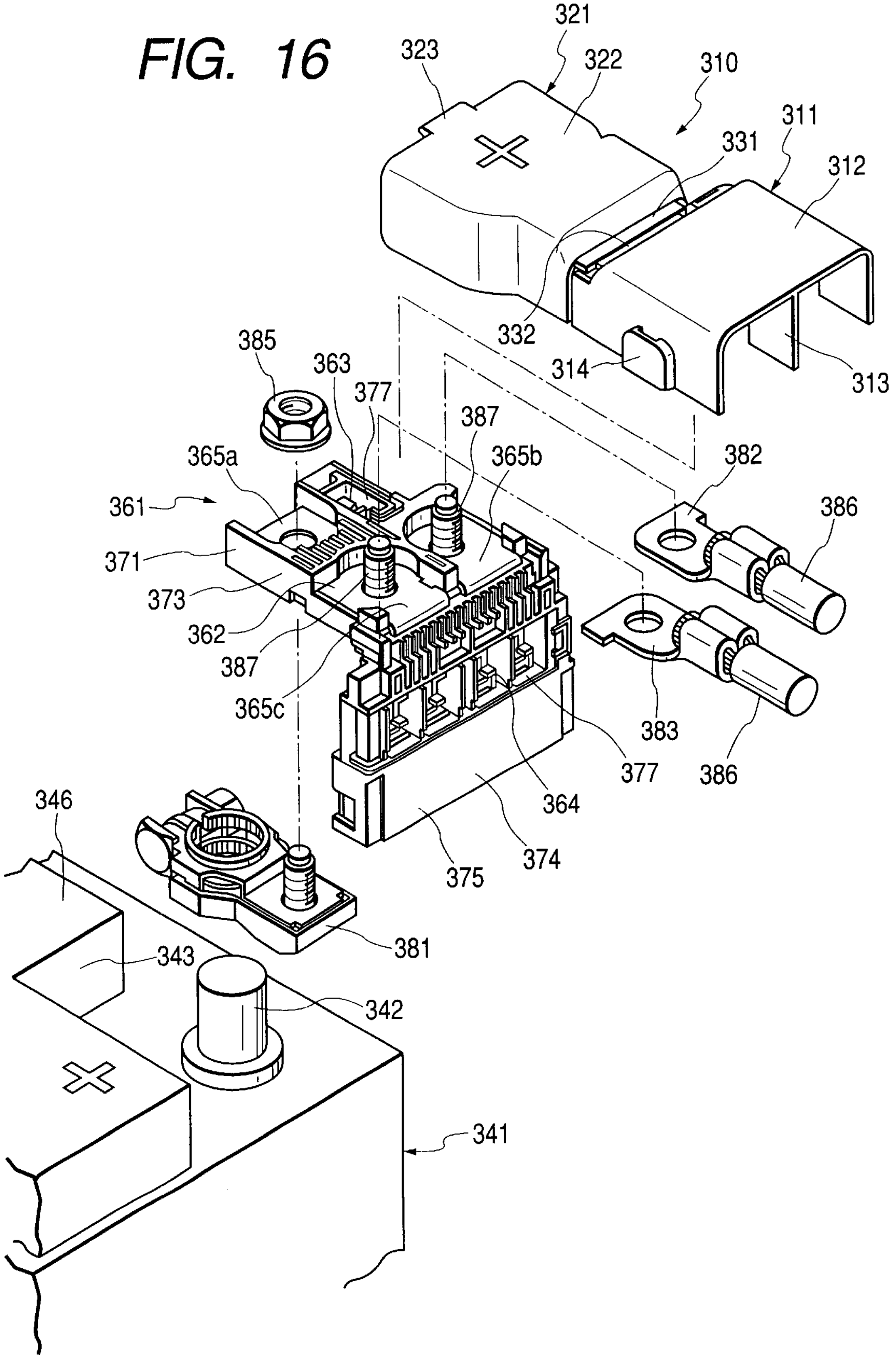
FIG. 16 is an exploded perspective view showing a state in which the battery cover illustrated in FIG. 10 is attached to a fuse unit.

With reference to FIGS. 14 and 16, schematic description will be given to the fuse unit 361 to which the battery cover 310 according to the invention is attached. The fuse unit 361 serves to connect the battery 341 to an electric wire 386 for power supply, and is constituted to take an almost L-shape by a plate-shaped fuse element 362 formed of conductive metal and including the fuses 363 and 364 and an insulating resin body 371 formed by insert molding the fuse element 362.

FIG. 14 shows the finishing state of the fuse unit 61 formed by integrally molding the resin body 371 to be an insulating synthetic resin material on the surface and back of the fuse element 362, and shows a state in which the fuse unit 361 is bent in a direction of 90 degrees and is assembled into the battery 341 for a vehicle.

First of all, the fuse element 362 formed of conductive metal and including a plurality of fuses 363 and 364 is punched out of one conductive metal plate, has a flexible portion 366 (FIG. 14) integrally in a middle portion and can be freely bent at the flexible portion 366 in a direction of a plate thickness. If the flexible portion 366 has a thickness equal to that of the fuse element 362, it can be flexed sufficiently. The flexible portion 366 of the fuse element 362 is provided in a portion in which a resin material of a resin mold (not shown) is not injected, and is thereby exposed to the outside of the resin body 371.

Four tab terminals which are not shown are arranged in parallel on the end of a conductive metal plate provided vertically by setting the flexible portion 366 to be the boundary. Each tab terminal is provided successively to the fuse 364 exposed from the resin body 371. The tab terminal is protruded and positioned into the fitting chamber of a connector housing 371 integrated with the resin body 371. The tab terminal and the connector housing 375 constitute a female-type connector.

As shown in FIG. 16, a connecting portion 365*a* for the battery terminal 381, a connecting portion 365*c* for the starter motor terminal 383 and a connecting portion 365*b* for the alternator terminal 382 are formed in a conductive metal plate provided horizontally. The fuse 363 is provided between the connecting portion 365*a* for the battery terminal 381 and the connecting portion 365*b* for the alternator terminal 382.

Next, the resin body 371 is formed by a division into front and rear sides with the middle portion to be the boundary. The fuses 363 and 364 are provided on both end sides of the fuse element 362 and are positioned in an empty chamber portion 377 of the resin body 371 and include a metal chip formed of an alloy of tin or lead. The resin body 371 is formed to be bendable at a right angle in the middle portion. The resin body 371 is partitioned into a dividing portion 373 positioned in a horizontal direction by setting the middle portion to be the boundary and a dividing portion 374 positioned in a vertical direction.

The dividing portion 373 in the horizontal direction is fastened and connected to the battery terminal 381 with a nut 385 in a vertical direction and is fastened and connected to the battery post 342 by utilizing the annular portion of the battery terminal 381. The dividing portion 374 in the vertical direction of the fuse unit 361 is vertically provided along the side wall surface of the battery 341 in a bending state at almost 90 degrees.

In a method of manufacturing the fuse unit 361, the fuse element 362 is first punched out of a conductive metal plate (not shown) and the fuse element 362 is set to a resin mold (not shown), and a molten resin material is injected into the resin mold, thereby integrally molding the resin body 371 on the surface and back of the fuse element 362. In this case, the resin body 371 provided around the terminal connecting portions 365*a*, 365*b* and 365*c* and the fuses 363 and 364 is set to be an empty chamber to expose the conductor surface of the fuse element 362.

As described above, according to the first aspect of the invention, when the second cover is to be closed, the guide rib of the second cover is guided while sliding over the guide face of the guide groove of the fuse unit and abuts on the position regulating face to be the groove wall surface on the closer side to the hinge portion. Consequently, the second cover is positioned in the longitudinal direction. Thus, the locking convex portion of the second cover is not brought into a blind state but is engaged with the concave portion of the fuse unit.

Accordingly, also in the case in which the second cover is removed from the hinge portion and thereby becomes a separate piece, the second cover can be fixed easily and reliably because it is positioned in the longitudinal direction by the guide rib and the guide groove.

According to the second aspect of the invention, moreover, the position regulating rib is protruded from the internal surface of the upper wall of the second cover. Therefore, when the second cover is to be closed, the tip face of the position regulating rib abuts on the upper part of the fuse unit, thereby carrying out the positioning in the direction of a height. In that case, the locking convex portion is engaged with the concave portion of the fuse unit on the other side and the convex portion engagement face abuts on the concave portion receiving face so that the fuse unit is interposed between the position regulating rib and the locking convex portion.

Accordingly, even if the second cover is removed from the hinge portion and thereby becomes a separate piece, the second cover can be reliably fixed to the fuse unit without a looseness.

According to the third aspect of the invention, furthermore, the guide groove is provided on the side wall of the fuse unit. During the operation for closing the second cover, therefore, the guide rib is guided while sliding over the guide groove (guide face) without interference with the side wall of the fuse unit and abuts on the groove wall surface (position regulating face), thereby carrying out the positioning in the longitudinal direction. Then, the locking convex portion is engaged with the concave portion on the other side so that the second cover is fixed to the fuse unit.

Accordingly, even if the second cover is removed from the hinge portion and thus becomes a separate piece, the closing operation and the fixation of the cover can be carried out easily and reliably by the guide means of the guide groove and the guide rib. Thus, it is possible to obtain the same effects as those in the first aspect of the invention.

According to the fourth aspect of the invention, moreover, since the position regulating rib is protruded from the internal surface of the upper wall of the second cover, positioning in a vertical direction (a direction of a height) is carried out by the position regulating rib. In that case, the locking convex portion is engaged with the concave portion on the other side so that the second cover is fixed to hold the fuse unit.

Accordingly, even if the second cover is removed from the hinge portion and thereby becomes a separate piece, the second cover can be reliably fixed to the fuse unit without a looseness. Thus, it is possible to obtain the same effects as those in the second aspect of the invention.

According to the fifth aspect of the invention, furthermore, since the wide portion having the guide face is provided in the guide groove. Therefore, the closing operation can be prevented from being blocked due to interference with the side wall of the fuse unit, and the guide rib can enter while sliding over the guide face. Moreover, since the narrow portion is formed successively to the wide portion, the guide rib is interposed between the groove walls and can be prevented from being loosened in the longitudinal direction.

Accordingly, even if the second cover is removed from the hinge portion and thereby becomes a separate piece, it is guided and positioned by the wide and narrow portions of the guide groove. Therefore, it is possible to fix the second cover to the fuse unit easily and reliably.

According to the sixth aspect of the invention, moreover, when the second cover is to be closed, the locking convex portion and the position regulating rib have such a positional relationship that couple is not generated. Therefore, the second cover can be prevented from being deformed or rotated due to a moment of couple.

Accordingly, even if the second cover is removed from the hinge portion and thereby becomes a separate piece, the second cover is fixed reliably so that the reliability of a lock mechanism can be enhanced.

According to the seventh aspect of the invention, furthermore, the guide rib abuts on the position regulating face during the operation for closing the second cover. Consequently, the positioning is accurately carried out in the longitudinal direction so that the reliability of the lock mechanism can be enhanced. As described above, according to the eighth aspect of the invention, the hinge portion and the connecting portion are provided in lower positions than the upper wall of the first cover and the upper wall of the second cover. Therefore, the interference of the bulged wall with the second cover can be avoided without the second cover protruded toward the bulged wall side around the battery post, and the relief portion to be formed on the front wall of the second cover can be reduced.

Accordingly, the invasion of waterdrops into the fuse unit can be blocked so that insulating, waterproof and dustproof properties can be enhanced.

According to the ninth aspect of the invention, moreover, the hinge portion is positioned behind the connecting portion of the second cover. Therefore, the radius of curvature of the opening and closing track of the second cover can be increased.

Accordingly, the radius of curvature (1/radius of curvature) of the opening and closing track of the second cover is reduced and the interference of the bulged wall of the battery with the second cover is avoided. Thus, it is possible to obtain the same effects as those of the first aspect of the invention.

According to the tenth aspect of the invention, furthermore, the center of rotation of the opening and closing track of the second cover is placed in a lower position than the upper surface of the bulged portion. Therefore, the protrusion of the opening and closing track toward the bulged wall side can be suppressed so that the space on the front side of the cover in the closing state of the second cover can be reduced.

Accordingly, the interference of the second cover with the bulged wall provided around the battery post can be avoided and the sealing property of the second cover can also be improved. Consequently, the insulating, waterproof and dustproof properties for the fuse unit can be enhanced.

According to the eleventh aspect of the invention, moreover, when the second cover is opened, the second inclined wall abuts on the first inclined wall so that the opening angle of the second cover is regulated.

Accordingly, even if the operation for opening and closing the second cover is repeated, the plastic deformation of the hinge portion can be prevented so that the battery cover can be used for a long period of time.

According to the twelfth aspect of the invention, furthermore, the connecting portion and the first inclined wall cross each other at an obtuse angle. Therefore, it is possible to prevent the plastic deformation of the hinge portion without deteriorating the opening and closing operability of the second cover.

According to the thirteenth aspect of the invention, moreover, the hinge portion is formed to have a smaller thickness than that of the connecting portion. Therefore, the flexibility of the hinge portion can be enhanced so that the second cover can be smoothly opened upward and closed downward.

Accordingly, a work for connecting the terminal to the fuse unit and a work for viewing the fuse can be easily carried out so that a workability can be enhanced.

According to the fourteenth aspect of the invention, furthermore, the hinge portion is provided between the two stud bolts protruded from the upper surface of the fuse unit. Therefore, the hinge portion can be formed in a lower position than the upper wall of the battery cover.

Accordingly, the opening and closing track of the second cover is improved and the interference of the second cover with the bulged wall of the battery is avoided so that the insulating property for the fuse unit can be enhanced.

What is claimed is:

1. A fuse box comprising:

a fuse element having a plurality of fuses formed therein;

a fuse unit including a resin body having the fuse element provided therein;

a protective cover comprising a first cover for covering the fuse unit and a second cover linked to the first cover through a rotating portion, the second cover being openable by setting the rotating portion to be a center of rotation;

a guide groove provided in the fuse unit and positioned close to the rotating portion when the cover and fuse unit are attached;

a concave portion, the guide groove and the concave portion being provided within a side wall of the fuse unit; and a guide rib for entering the guide groove and a locking convex portion to be engaged with the concave portion, said guide rib and said locking convex portion being provided on an internal surface of a side wall of the second cover.

2. The fuse box according to claim 1, further comprising:

a position regulating rib to abut on an upper part of the fuse unit being protruded from an internal surface of an upper wall of the second cover.

3. The fuse box according to claim 1, wherein the guide groove is defined by a wide portion having an inclined guide face and a narrow portion extended in a closing direction successively to the wide portion.

4. The fuse box according to claim 2, wherein the locking convex portion and the position regulating rib lie in the same plane which is orthogonal to both side walls of the second cover.

5. The fuse box according to claim 3, further comprising:

a groove wall surface linking the wide portion to the narrow portion corresponding to a position regulating face for the guide rib.

6. A protective cover comprising:

a first cover for covering a fuse unit connected to a battery post;

a second cover linked to the first cover through a rotating portion, the second cover being openable by setting the rotating portion to be a center of rotation;

a guide rib provided on an internal surface of a side wall of the second cover and receivable in a guide groove of a side wall of the fuse unit; and a locking convex portion receivable in a concave portion of the side wall of the fuse unit, the locking convex portion being provided on the internal surface of the side wall of the second cover.

7. The protective cover according to claim 1, further comprising:

a position regulating rib to abut on an upper part of the fuse unit protruded from an internal surface of an upper wall of the second cover.

8. A protective cover comprising:

a first cover for covering an upper portion of a fuse unit connected to a battery post;

a second cover linked to the first cover through a hinge portion, the second cover being openable by setting the hinge portion to be a center of rotation;

a connecting portion provided successively to the hinge portion, and the hinge portion and the connecting portion provided in lower positions than an upper wall of the first cover and an upper wall of the second cover.

9. The protective cover according to claim 8, wherein the connecting portion is connected integrally with the second cover.

10. The protective cover according to claim 8, wherein the hinge portion is formed in a lower position than an upper surface of a bulged portion provided around the battery post.

11. The protective cover according to claim 8, further comprising:

a first inclined wall provided between the hinge portion and the first cover;

a second inclined wall provided between the connecting portion and the second cover, and both of the inclined walls abutting to regulate an opening angle of the second cover.

12. The protective cover according to claim 11, wherein the first inclined wall and the connecting portion form an obtuse angle.

13. The protective cover according to claim 8, wherein the hinge portion is formed to have a smaller thickness than that of the connecting portion.

14. The protective cover according to claim 8, wherein the hinge portion is provided between two parallel stud bolts of the fuse unit.

* * * * *